2,795,063
METAL PANEL GATE

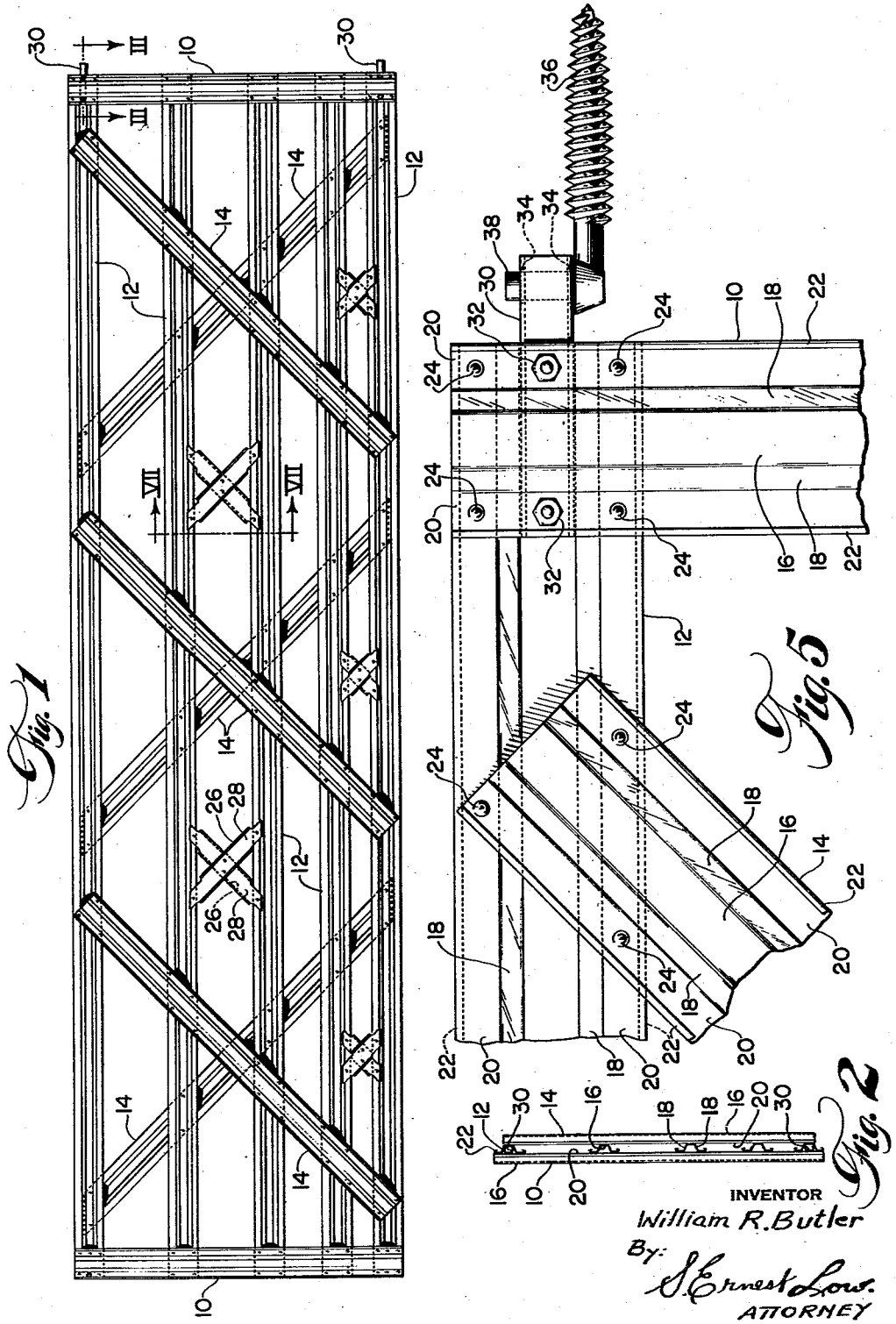

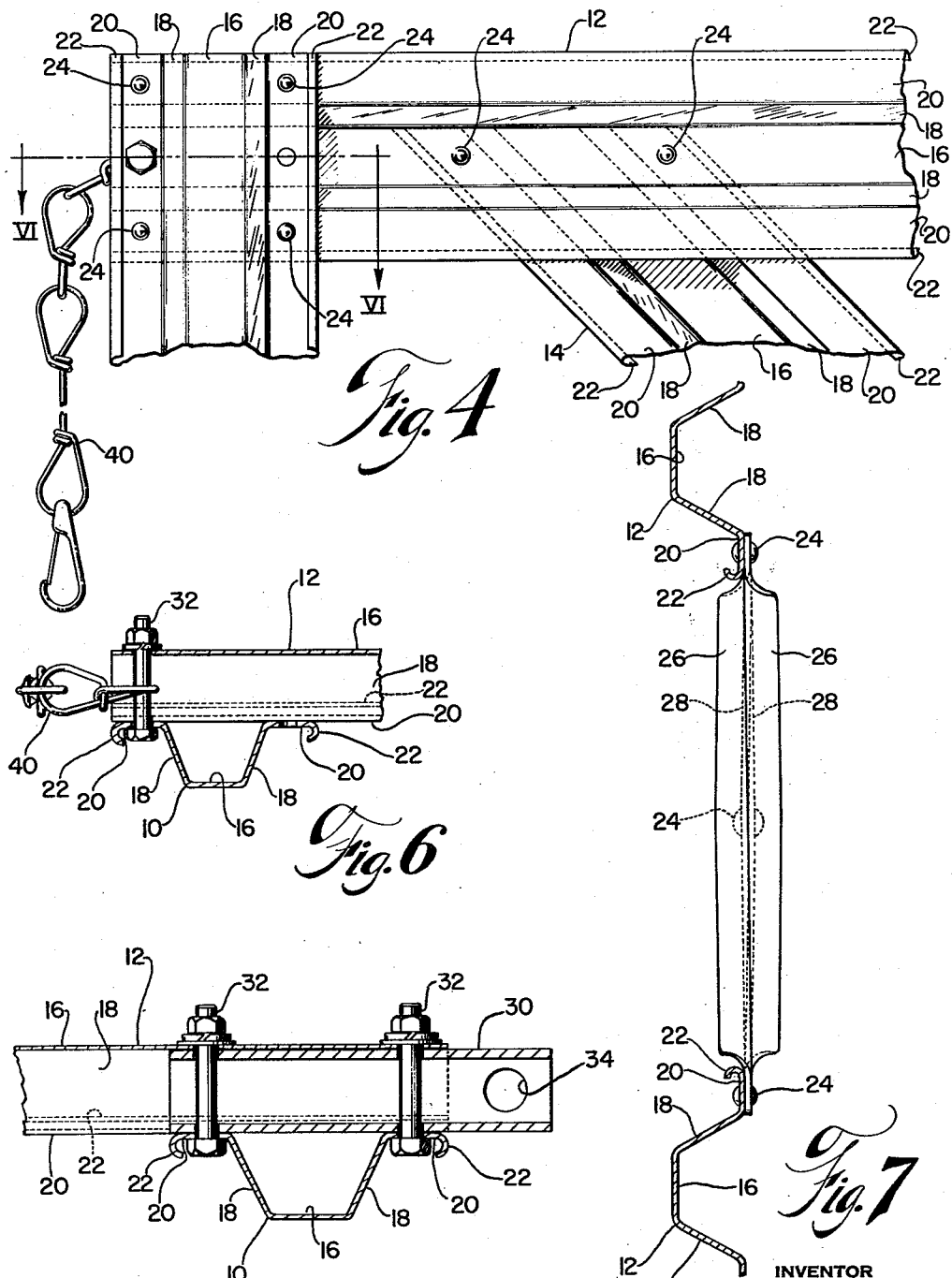

William R. Butler, Pittsburgh, Pa., assignor to Aluminum Company of America, Pittsburgh, Pa., a corporation of Pennsylvania Application November 1, 1955, Serial No. 544,108

3 Claims. (Cl. 39—87)

This invention relates in general to panels, and is more specifically concerned with a fence panel suitable for use as a gate.

It is a primary object of the invention to provide a panel member which can be employed in sections of unit length to form a fence and which is equally adaptable as a gate within an otherwise enclosing fence structure.

It is another object of the invention to provide a panel structure made from preformed sheet metal or extruded metallic members which are readily assembled in reinforced braced relationship to present a structurally rigid unit which can be interchangeably used as a fence panel or gate.

Other objects will be appreciated and understood on consideration of the following description and illustrations in which:

Fig. 1 represents a front elevational view of a panel incorporating the structural features of the invention;

Fig. 2 represents an end elevational view of the panel of Fig. 1, as viewed from the right thereof;

Fig. 3 represents a fragmentary sectional view to slightly enlarged scale taken on the plane III—III of Fig. 1;

Fig. 4 represents a fragmentary elevational view to slightly enlarged scale of the upper left hand corner of the panel of Fig. 1;

Fig. 5 represents a fragmentary elevational view to slightly enlarged scale of the upper right hand corner of the panel of Fig. 1;

Fig. 6 represents a fragmentary sectional view taken on the plane VI—VI of Fig. 4; and Fig. 7 represents a fragmentary view in partial section taken on the plane VII—VII of Fig. 1.

The fence and/or gate panel of the invention basically comprises end post members to which are secured a plurality of horizontal rail members with diagonal bracing members disposed intermediate the end post members and secured to the horizontal rail members on opposite sides thereof to impart planar and torsional rigidity to the panel. All of the members thus far mentioned are preferably of identical cross-section and are prefabricated in the form of hat-shaped stiffener elements of generally channel form with laterally extending marginal flanges contiguous with the channel legs and lying in a plane parallel with the web of the channel. The individual members may be produced by extrusion, in which case accurate dimensional tolerances and duplication of the members are assured, or they may be fabricated from sheet metal employing standard sheet metal tools and practices. Regardless of whether extruded or preformed sheet metal channel members are employed in constructing a panel of the invention, the panel preferably incorporates further stiffening elements in the form of crossed bracing members which are located where added stiffness is desired, such as between the bottom two horizontal rail members below and within the lower diverging portions of the first-mentioned diagonal cross bracing members, as well as at one or more intermediate locations between the second and third horizontal rail members, counting from the top rail of the panel, at points along the length of a panel between adjacent pairs of the first-mentioned diagonal bracing members, when two or more pairs of diagonal bracing members are employed in the panel construction.

Referring now to the drawings, the panel illustrated therein comprises end post members 10, horizontal rail members 12 in parallel spaced relationship secured at their ends to the posts 10, to form a generally rectangular frame structure, and having at least one diagonal member 14 on each side of the panel disposed in X-braced relationship, the diagonal members being secured at their ends to the upper and lowermost horizontal rail members 12 and to the remaining longitudinal members 12 lying therebetween at their areas of superimposed relationship.

Figs. 2, 3 and 6 illustrate to best advantage the preferred geometric and cross-sectional shape of the members 10, 12 and 14. It will be observed that each of the identified members is of generally channel shape having a web section 16, contiguous depending diverging legs 18 and contiguous lateral marginal flanges 20, the latter lying in a plane parallel to the plane of the web 16. In the preferred form of the invention, the flanges 20 are curled upwardly and rearwardly towards the legs 18 to provide a stiffened reinforced edge 22 thereon.

This curled edge feature, whether present in an extruded or sheet-formed member, imparts rigidity to the member, and in the case of a sheet-formed member insures against an exposed, raw, unprotected cutting edge.

It will further be observed in the panel thus far described that the underside of the lateral flanges 20 of the horizontal rail members 12 abut against an underside of the similar lateral flanges 20 on the end posts 10, and that suitable securing means, such as a bolt and nut or rivet fastening means 24, passing through the superimposed flanges 20, serve to draw and hold the rail and post members in rigid assembly. In similar fashion, the diagonal bracing member or members 14 on one side of the panel are secured to the top and bottom rail members, as well as to the intermediate rail members, through their superimposed overlying flanges 20, the diagonal member or members 14 on the opposite side of the panel, which form an X-bracing with the previously mentioned diagonal member or members 14, being disposed with the underside of their flanges 20 in contact with the flat plane surfaces presented by the outer surface of each of the webs 16 of the horizontal rail members 12, the fastening means 24, such as the aforementioned bolt and nut or rivet fastening devices, extending through the flange 20 and web 16 securing the same in rigid assembly. Where the panel of the invention is eight feet or more in length between its end posts 10, the preferred construction would include two or more diagonal bracing members 14 on each side or face of the panel, as shown in the drawings, to insure rigidity and strength of the panel in its vertical plane. The diagonal X-bracing also insures against sag in the panel in respect to its hinges, when the same is used as a gate, to be hereinafter described. The fastening elements 24 can be replaced by spot welds, if desired.

Additional or auxiliary X-bracing members are preferably incorporated in the panel between the bottom two horizontal rail members 12, below and within the lower diverging legs of the diagonal bracing members 14, and between the second and third horizontal rail members 12, counting downwardly from the uppermost horizontal rail member, at points along the length of the panel between adjacent pairs of diagonal bracing members 14. This additional X-bracing is preferably provided in the form of sheet metal stampings of generally channel cross-section assembled in X-disposition as by welding or riveting in web-to-web relationship, the flanges 26 being removed if desired adjacent the ends of the webs 28 to provide flat superimposed overlying assembly on the underside of the lateral flanges 20 of the rail members 12 associated therewith. Bolt and nut or rivet fastening means, as well as welded jointure, can also be used in securing this additional bracing in place.

The location of the auxiliary or additional X-bracing is selected to give maximum rigidity to the panel at the particular places where it would normally otherwise be weakened by persons climbing on the bottom two rails of the panel, or riding the same when it is employed as a gate. It will also be observed that the additional X-bracing is located lengthwise between the posts at points presenting maximum lengths of non-braced horizontal rail members 12. The additional loading of the panel or gate mentioned above could also result from cattle attempting to force their way through the same.

When it is desired to use the panel of the invention as a gate, tubular members 30, preferably or substantially square cross-section and having heavy wall thickness, as compared to the gauge of the metal of the remaining members of the panel, are slipped into the space between the legs 18 of the top and bottom longitudinal rail members 12 where they are secured by through bolts 32, or the like, with a portion of the members 30 extending outwardly beyond the outer edge or boundary of the end post 10 nearest thereto. The extending end portions of the tubular members 30 are drilled or otherwise provided with aligned apertures 34 which receive upstanding cylindrical pin ends 38 of L-bolts or screws 36 fastened or secured to a suitable gate-supporting post not shown.

Post 10 opposite to that carrying the hinges can be provided with a suitable form of chain-supported pin and snap means 40 for securing the gate in its closed position.

In the flange-to-flange attachment between end posts 10 and horizontal members 12, as well as in the flange-to-flange attachment between the horizontal rail members 12 and diagonal bracing members 14, fastening elements 24, whether they be bolts and nuts, rivets or spot welds, are preferably employed at each location where the lateral flanges 20 cross over or overlap each other. In similar fashion, the fastening elements 24, connecting the lateral flanges 20 of the remaining diagonal members 14 in co-planar superimposed disposition in respect to the exterior surface of the webs 16 of the horizontal rail members 12, are located where each flange 20 bears on or overlaps the webs 16. This provides at least two fastening elements 24 in both the aforesaid types of jointure between the members 10, 12 and 14 and insures rigid joint construction. In addition, the webs 28 of the auxiliary stiffener cross-braced channels may extend across and be fastened to both lateral flanges 20 of the horizontal rail members 12 with which they are associated, when such added strength and rigidity are required, as distinguished from the single web-to-flange connections illustrated in the appended drawings.

Individual panels of the invention may be fastened directly to regularly employed fence posts embedded in the ground, or they may be fastened to each other by employing the hinge tubes 30 at both ends of a panel section and coupling adjacent panels through the medium of a suitable tie passing through the apertures 34 in the tubular hinge receiving members.

The invention has been described in terms of a specific form of panel structure. It is not intended that the invention be restricted to the specific illustrations and description except as defined in the claims appended hereto.

What is claimed is:

1. An enclosure panel comprising a pair of spaced vertically disposed end posts, a plurality of horizontal vertically spaced rail members attached at their ends to the end posts, at least one diagonal brace attached at its ends to the upper and lowermost horizontal rail members as well as to all intermediate horizontal rail members underlying the same, said end posts, horizontal rail members and diagonal brace being of similar cross-section and of generally channel shape with the legs thereof turned outwardly to provide contiguous lateral flat flanges the underside surfaces of which lie in a single plane parallel to a second plane co-planar with the outer flat surfaces of the webs thereof, the marginal edges of the lateral flat flanges being curled upwardly and rearwardly away from their underside flat surfaces to reinforce the same, the attachment between the end posts and horizontal rail members as well as the attachment between the diagonal brace and horizontal rail members being constituted with the underside flat surfaces of the lateral flanges in superimposed abutting relationship in a single plane, at least one further diagonal brace of the same general cross-section on the opposite side of the panel disposed in X-braced relationship to the first-mentioned diagonal brace, said second-mentioned diagonal brace being attached to the outer flat surface of the web of each horizontal rail member with the flat underside of its lateral flat flanges in contact with the single plane of the webs parallel to the first-mentioned single plane lateral flat flange-to-flange attachment, and at least one cross-braced stiffener attached to oppositely disposed lateral flat flanges of the two lowermost horizontal rail members located between the diverging legs of the diagonal X-bracing.

2. A sheet metal gate comprising a pair of spaced vertically disposed end posts, a plurality of horizontal vertically spaced rail members attached at their ends to the end posts, at least one diagonal brace attached at its ends to the upper and lowermost horizontal rail members as well as to all intermediate horizontal rail members underlying the same, said end posts, horizontal rail members and diagonal brace being of similar cross-section and of generally channel shape with the legs thereof turned outwardly to provide contiguous lateral flat flanges the underside surfaces of which lie in a single plane parallel to a second plane co-planar with the outer flat surfaces of the webs thereof, the marginal edges of the lateral flat flanges being curled upwardly and rearwardly away from their underside flat surfaces to reinforce the same, the attachment between the end posts and horizontal rail members as well as the attachment between the diagonal brace and horizontal rail members being constituted with the underside flat surfaces of the lateral flanges in superimposed abutting relationship in a single plane, at least one further diagonal brace of the same general cross-section on the opposite side of the panel disposed in X-braced relationship to the first-mentioned diagonal brace, said second-mentioned diagonal brace being attached to the outer flat surface of the web of each horizontal rail member with the flat underside of its lateral flanges in contact with the single plane of the webs parallel to the first-mentioned single plane lateral flat flange-to-flange attachment, a cross-braced stiffener attached to oppositely disposed lateral flat flanges of the two lowermost horizontal rail members located between the diverging legs of the diagonal X-bracing, a tubular hinge support of generally rectangular cross-section inserted within the upper and lower space defined between the superimposed lateral flat flanges of one end post and the upper and lower horizontal rail members respectively, said tubular hinge supports extending outwardly beyond the end post and being secured in position within the aforesaid spaces, and aligned hinge pin receiving apertures through vertically opposed walls of the tubular hinge supports.

3. A sheet metal enclosing panel structure comprising a pair of spaced vertically disposed end posts, a plurality of horizontal vertically spaced rail members attached at their ends to the end posts, a plurality of laterally spaced diagonal braces attached at their ends to the upper and lower horizontal rail members as well as to all intermediate horizontal rail members underlying the same, said end posts, horizontal rail members and diagonal braces being of similar cross-section and of generally channel shape with the legs thereof turned outwardly to provide contiguous lateral flat flanges the underside surfaces of which lie in a single plane parallel to a second plane coplanar with the outer flat surfaces of the webs thereof, the marginal edges of the lateral flat flanges being curled upwardly and rearwardly away from their underside surfaces to reinforce the same, the attachment between the end posts and horizontal rail members as well as the attachment between the diagonal braces and horizontal rail members being constituted with the underside flat surfaces of the lateral flanges in superimposed abutting relationship in a single plane, a plurality of laterally spaced diagonal braces of the same general cross-section on the opposite side of the panel equal in number to the first-mentioned diagonal braces and disposed in X-braced relationship thereto, said second-mentioned diagonal braces being attached to the outer flat surface of the web of each horizontal rail member with the flat underside of their lateral flanges in contact with the single plane of the flat webs parallel to the first-mentioned single plane lateral flat flange-to-flange attachment, cross-braced channel shaped stiffeners secured in web-to-web relationship attached through their flat webs to oppositely disposed flat lateral flanges of the two lowermost horizontal rail members located between the diverging legs of the diagonal X-bracing, and similar stiffeners similarly attached to oppositely disposed flat lateral flanges of the second and third horizontal rail member from the top of the panel, said last-mentioned stiffeners being located between pairs of the diagonal X-bracing along the length of the panel.

References Cited in the file of this patent

UNITED STATES PATENTS

| | | |
|---|---|---|
| 618,619 | Ritter | Jan. 31, 1899 |
| 1,074,693 | Carter et al. | Oct. 7, 1913 |
| 1,233,719 | Showalter | July 17, 1917 |
| 2,515,754 | Wolfe et al. | July 18, 1950 |
| 2,683,589 | Thatcher | July 13, 1954 |

FOREIGN PATENTS

| | | |
|---|---|---|
| 656,299 | France | Jan. 2, 1929 |